(12) United States Patent
Lindner et al.

(10) Patent No.: US 9,808,969 B2
(45) Date of Patent: Nov. 7, 2017

(54) FIBER COMPOSITE COMPONENT AND A PROCESS FOR THE PRODUCTION THEREOF

(75) Inventors: Stefan Lindner, Köln (DE); Klaus Franken, Bergisch Gladbach (DE); Dirk Passmann, Oberhausen (DE); Peter Nordmann, Dormagen (DE)

(73) Assignee: COVESTRO DEUTSCHLAND AG, Leverkusen (DE)

( * ) Notice: Subject to any disclaimer, the term of this patent is extended or adjusted under 35 U.S.C. 154(b) by 0 days.

(21) Appl. No.: 13/817,300

(22) PCT Filed: Aug. 12, 2011

(86) PCT No.: PCT/EP2011/063907
§ 371 (c)(1),
(2), (4) Date: Apr. 29, 2013

(87) PCT Pub. No.: WO2012/022683
PCT Pub. Date: Feb. 23, 2012

(65) Prior Publication Data
US 2013/0244520 A1     Sep. 19, 2013

(30) Foreign Application Priority Data

Aug. 16, 2010   (DE) .................. 10 2010 039 346

(51) Int. Cl.
| | |
|---|---|
| *B29C 45/00* | (2006.01) |
| *C08G 18/40* | (2006.01) |
| *C08G 18/58* | (2006.01) |
| *C08J 5/24* | (2006.01) |
| *C08G 18/48* | (2006.01) |
| *B29C 45/02* | (2006.01) |

(52) U.S. Cl.
CPC ........ *B29C 45/0001* (2013.01); *B29C 45/02* (2013.01); *C08G 18/4045* (2013.01); *C08G 18/4829* (2013.01); *C08G 18/58* (2013.01); *C08J 5/24* (2013.01); *C08J 2375/04* (2013.01); *Y10T 442/2992* (2015.04)

(58) Field of Classification Search
CPC ........... C08G 18/4045; C08G 18/4829; C08G 18/58; C08J 5/24; C08J 2375/04; B29C 45/0001; B29C 45/02; Y10T 442/2992
USPC .................. 442/180; 416/230; 264/511
See application file for complete search history.

(56) References Cited

U.S. PATENT DOCUMENTS

| | | | |
|---|---|---|---|
| 4,251,427 A * | 2/1981 | Recker | C08G 18/0885 427/393.5 |
| 4,726,868 A | 2/1988 | Goel et al. | |
| 5,416,125 A * | 5/1995 | Liman et al. | 521/160 |
| 5,468,832 A | 11/1995 | Schrader et al. | |
| 5,480,958 A | 1/1996 | Starner et al. | |
| 5,621,043 A | 4/1997 | Croft | |
| 6,420,493 B1 * | 7/2002 | Ryckis-Kite et al. | 525/440.08 |
| 2005/0280173 A1 * | 12/2005 | Wirtz et al. | 264/46.4 |
| 2007/0117947 A1 * | 5/2007 | Wehner | 528/44 |

FOREIGN PATENT DOCUMENTS

| | | |
|---|---|---|
| DE | 4416323 A1 | 11/1995 |
| WO | WO-2007/064801 A1 | 6/2007 |
| WO | WO-2008/147641 A1 | 12/2008 |

OTHER PUBLICATIONS

International Search Report for PCT/EP2011/063907 dated Nov. 30, 2011.

\* cited by examiner

*Primary Examiner* — Vincent A Tatesure
(74) *Attorney, Agent, or Firm* — K&L Gates LLP

(57) ABSTRACT

The present invention relates to sheet-form fiber composite components which are obtainable by impregnating fibers with a reactive resin mixture comprising polyisocyanates, polyepoxides, polyols and optionally additives, and to a process for the production thereof.

9 Claims, No Drawings

FIBER COMPOSITE COMPONENT AND A PROCESS FOR THE PRODUCTION THEREOF

RELATED APPLICATIONS

This application is a national stage application (under 35 U.S.C. §371) of PCT/EP2011/063907, filed Aug. 12, 2011, which claims benefit of German Patent Application No. 10 2010 039 346.0, filed Aug. 16, 2010.

The present invention relates to sheet-form fibre composite components which are obtainable by impregnating fibres with a reaction resin mixture comprising polyisocyanates, polyepoxides, polyols and optionally additives, and to a process for the production thereof.

Fibre-reinforced plastics are used as a construction material because they have high mechanical strength combined with low weight. The matrix material conventionally consists of unsaturated polyester resins, vinyl ester resins and epoxide resins.

DE4416323 describes heat-curable reaction resin mixtures which comprise organic polyisocyanates, organic compounds containing epoxide groups, and mixtures of specific tertiary amines (catalysts). Initial curing of the reaction resin mixtures is carried out at temperatures of up to 80° C., and post-curing at temperatures of from 100 to 200° C. A disadvantage of these reaction resin mixtures is that they cure fully only at high temperatures and have long cycle times, which leads to high energy and production costs.

WO2008/147641 describes the production of a cured composition which is produced from blocked isocyanates, an epoxy resin and a catalyst, at least one oxazolidone and isocyanurate ring being formed. The composition can be used as a surface coating or in the production of composite materials. A disadvantage of this composition is that, in a multi-stage process, the polyurethane prepolymer must be prepared first and then reacted to give a blocked prepolymer which can be used as the reactive resin component.

U.S. Pat. No. 5,480,958 describes polyepoxide resins which a polyepoxide resin are obtained from a polyglycidyl ether of a phenol and an oxazolidone toughener using a latent curative and an accelerator. The oxazolidone tougheners (epoxy-terminated urethane prepolymers) are prepared from an NCO-terminated urethane prepolymer and a polyepoxide. The NCO-terminated urethane prepolymer is prepared from a polyisocyanate and a polyol. The epoxy-terminated urethanes used have viscosities of over 400 to 600 poises. The polyepoxide resins are used in the production of plates. It is a disadvantage that the epoxy-terminated urethanes used have a high viscosity, which makes processing more difficult.

Fibre composite materials can be used, for example, in aircraft building, in automobile construction or in rotor blades of wind turbines.

The known processes for the production of fibre composite components can be used, such as, for example, manual lay-up, transfer moulding, resin transfer moulding or vacuum-assisted infusion processes (for example VARTM (Vacuum Assisted Resin Transfer Moulding)) or prepreg technology.

The previous processes have the disadvantage that it takes a very long time for the reactive resin mixture to cure, which leads to low productivity. In order to increase the productivity it is necessary to reduce the cycle time during the production. It is important that the reaction resin mixture is of low viscosity for a long time in order to impregnate the fibres completely. On the other hand, the curing time should be as short as possible in order to reduce the cycle time. For economic reasons, a low curing temperature is desirable because energy costs can thereby be saved.

The object of the present invention was, therefore, to provide a matrix material which permits good impregnation and wetting of the fibres and at the same time ensures rapid curing and good mechanical properties.

It was, surprisingly, possible to achieve the object by fibre composite components which are obtainable from fibre layers and a reaction resin mixture comprising polyisocyanates, polyepoxides, polyols and optionally conventional additives.

The invention provides sheet-form fibre composite components comprising a fibre layer impregnated with polyurethane, wherein the polyurethane is obtainable from a reaction mixture comprising A) one or more polyisocyanates,
B) one or more polyols,
C) one or more polyepoxides, and
D) optionally additives,
wherein the mixture at 35° C. has a viscosity of from 50 to 500 mPas, preferably from 70 to 250 mPas, particularly preferably from 70 to 150 mPas, and a ratio of the number of NCO groups to the number of OH groups of component B) of from 1.3:1 to 10:1, preferably from 1.5:1 to 3:1, and a ratio of the number of NCO groups to the number of epoxide groups of component C) of from 1.1:1 to 10:1, preferably from 1.2:1 to 4:1.

The polyurethane used according to the invention in principle does not contain oxazolidinone groups. If, contrary to expectations, undesirable oxazolidinone groups should nevertheless occur in the polyurethane as a result of subordinate secondary reactions, the content thereof is less than 1 wt. %, based on polyurethane. The oxazolidinone groups form when polyisocyanates react with epoxides.

The viscosity is determined as indicated in the examples section.

The composite component according to the invention preferably has on one side of the polyurethane-containing fibre layer a so-called spacer material layer and a polyurethane-containing fibre layer, which preferably contains the same polyurethane as the first-mentioned fibre layer.

Preferred fibre composite components have on one side of the polyurethane-containing fibre layer one or more protective or decorative layers. The protective layers are preferably one or more gelcoat layers, preferably of polyurethane (PUR), epoxide, unsaturated polyester or vinyl ester resins.

A preferred fibre composite component has on the side of the polyurethane-containing fibre layer remote from the gelcoat layer a so-called spacer layer, which is followed by a further polyurethane-containing fibre layer, which preferably contains the same polyurethane as the first-mentioned fibre layer.

The spacer layer consists, for example, of balsa wood, PVC foam, PET foam or PUR foam. The spacer layer can be formed on the fibre layer over the whole of its surface or over part of its surface. In addition, it can have a thickness that differs over the surface.

Particular preference is given to a fibre composite component that contains in the fibre layer a polyurethane obtainable from 40 to 60 wt. %, preferably 45 to 55 wt. %, polyisocyanates, 10 to 45 wt. %, preferably 15 to 40 wt. %, polyols, 10 to 30 wt. %, preferably 15 to 25 wt. %, polyepoxides and 0 to 5 wt. %, preferably 1 to 3 wt. %, additives, wherein the sum of the amounts by weight of the components is 100 wt. %.

The fibre content in the fibre composite component is preferably more than 50 wt. %, particularly preferably more than 65 wt. %, based on the total weight of the fibre composite component. The fibre content in the case of glass fibres can be determined subsequently by calcination, for example, and the initial weight controlled.

The invention further provides a process for the production of the sheet-form fibre composite components according to the invention, wherein
a) a mixture of
A) one or more polyisocyanates,
B) one or more polyols,
C) one or more polyepoxides, and
D) optionally additives
is prepared, wherein the mixture at 35° C. has a viscosity of from 50 to 500 mPas, preferably from 70 to 250 mPas, particularly preferably from 70 to 150 mPas, and a ratio of the number of NCO groups to the number of OH groups of component B) of from 1.3:1 to 10:1, preferably from 1.5:1 to 3:1, and a ratio of the number of NCO groups to the number of epoxide groups of component C) of from 1.1:1 to 10:1, preferably from 1.2:1 to 4:1,
b) a fibre material is laid in a mould half,
c) the mixture prepared under a) is introduced into the fibre material from b) in order to produce an impregnated fibre material,
d) the impregnated fibre material cures at a temperature of from 20 to 120° C., preferably from 70 to 90° C.

The mould half is preferably provided with a release agent before the fibre material is introduced. Further protective or decorative layers can be inserted into the mould half before the fibre material is introduced, such as, for example, one or more gelcoat layers.

In a preferred embodiment, a so-called spacer layer is applied to the fibre material that is already in the mould half, and a further fibre material layer, for example of fibre mats, woven fibres or non-crimped fibres, is applied thereto. The polyurethane mixture is then poured into the layers. The spacer layer consists, for example, of balsa wood, polyvinyl chloride (PVC) foam, polyethylene (PET) foam or polyurethane (PUR) foam.

Preferably, after the fibre material has been laid in the mould half, a film is placed on the fibre material, vacuum is generated between the film and the mould half, and the reaction mixture is introduced through the film (Vacuum Assisted Resin Transfer Moulding (VARTM)). By means of this process it is possible to produce also large components such as rotor blades of wind turbines. If required, so-called flow promoters (e.g. in the form of mats that are stable under pressure but permeable to resin) can be introduced between the film and the fibre material, which flow promoters can be removed again after curing.

In the RTM (Resin Transfer Moulding) process, which is likewise preferred, the mould is closed with a mould counterpart instead of the vacuum-resistant film, and the resin mixture, optionally under pressure, is introduced into the mould.

The reaction resin mixtures used according to the invention have low viscosities and long processing times and exhibit short curing times at low curing temperatures and thus permit the rapid manufacture of fibre composite components.

A further advantage of the reaction resin mixtures used according to the invention is the improved processing behaviour owing to rapid compatibility of the mixture of polyol and polyepoxide with the polyisocyanate. With the uncatalysed systems of polyisocyanate and polyols used hitherto, the components must be mixed for several minutes beforehand because it is only by the start of urethane formation that compatibility of the components and homogeneity of the mixture is achieved, which is necessary for processing because otherwise curing is incomplete or the products are inhomogeneous. The components of the reaction resin mixtures can be mixed at from 20 to 50° C., preferably at from 30 to 40° C., and applied to the fibre material.

The reaction mixture used according to the invention can be processed on casting machines with static mixers or with dynamic mixers, because only a short mixing time is necessary. This is a great advantage in the production of the fibre composite components according to the invention because the reactive resin mixture must have as low a viscosity as possible for good impregnation. A mixture which must be mixed for several minutes just beforehand already exhibits too high a viscosity owing to the formation of urethane groups.

A further advantage is that, by the use of polyepoxides in combination with polyisocyanates and polyols, the binding of the reaction resin mixture to the fibres, in particular glass fibres, is improved markedly. This binding of the fibres to the matrix material (described by the parameter "interlaminar shear strength") makes an important contribution to the mechanical properties of the fibre composite component. The interlaminar shear strength is therefore an important parameter for the composite of fibre material and matrix material.

A further advantage of the reaction mixture used according to the invention is that it can be processed in a one-stage process, and a low curing temperature of below 120° C. is sufficient.

There can be used as the polyisocyanate component A) the conventional aliphatic, cycloaliphatic and in particular aromatic di- and/or poly-isocyanates. Examples of such suitable polyisocyanates are 1,4-butylene diisocyanate, 1,5-pentane diisocyanate, 1,6-hexamethylene diisocyanate (HDI), isophorone diisocyanate (IPDI), 2,2,4- and/or 2,4,4-trimethylhexamethylene diisocyanate, the isomeric bis(4,4'-isocyanatocyclohexyl)methanes or mixtures thereof of any desired isomer content, 1,4-cyclohexylene diisocyanate, 1,4-phenylene diisocyanate, 2,4- and/or 2,6-toluene diisocyanate (TDI), 1,5-naphthylene diisocyanate, 2,2'- and/or 2,4'- and/or 4,4'-diphenylmethane diisocyanate (MDI) and/or higher homologues (pMDI), 1,3- and/or 1,4-bis-(2-isocyanato-prop-2-yl)-benzene (TMXDI), 1,3-bis-(isocyanatomethyl)benzene (XDI). In addition to the polyisocyanates mentioned above, modified polyisocyanates with a uretdione, isocyanurate, urethane, carbodiimide, uretonimine, allophanate or biuret structure can also be used proportionately. Diphenylmethane diisocyanate (MDI) and in particular mixtures of diphenylmethane diisocyanate and polyphenylenepolymethylene polyisocyanate (pMDI) are preferably used as the isocyanate. The mixtures of diphenylmethane diisocyanate and polyphenylenepolymethylene polyisocyanate (pMDI) have a preferred monomer content of from 60 to 100 wt. %, preferably from 70 to 95 wt. %, particularly preferably from 80 to 90 wt. %. The NCO content of the polyisocyanate used should preferably be over 25 wt. %, more preferably over 30 wt. %, particularly preferably over 32 wt. %. The viscosity of the isocyanate should preferably be ≤150 mPas (at 25° C.), more preferably ≤50 mPas (at 25° C.) and particularly preferably ≤30 mPas (at 25° C.).

The polyols B) can have, for example, a number-average molecular weight $M_n$ of from ≥62 g/mol to ≤8000 g/mol, preferably from ≥90 g/mol to 5000 g/mol and particularly preferably from ≥92 g/mol to ≤1000 g/mol. In the case of a single added polyol, the OH number of component B) indicates the OH number thereof. In the case of mixtures, the number-average OH number is indicated. That value can be determined on the basis of DIN 53240. The polyol formulation preferably comprises as polyols those which have a number-average OH number of from 200 to 1830 mg KOH/g, preferably from 300 to 1000 mg KOH/g and particularly preferably from 350 to 500 mg KOH/g. The viscosity of the polyols is preferably 800 mPas (at 25° C.). The polyols preferably have at least 60% secondary OH groups, more preferably at least 80% secondary OH groups and particularly preferably 90% secondary OH groups. Polyether polyols based on propylene oxide are particularly preferred. The polyols used preferably have a mean functionality of from 2.0 to 4.0, particularly preferably from 2.5 to 3.5.

According to the invention, polyether polyols, polyester polyols or polycarbonate polyols can be used; polyether polyols are preferred. Polyether polyols which can be used according to the invention are, for example, polytetramethylene glycol polyethers, as are obtainable by polymerisation of tetrahydrofuran by means of cationic ring opening. Polyether polyols which are likewise suitable are addition products of styrene oxide, ethylene oxide, propylene oxide and/or butylene oxides on di- or poly-functional starter molecules. Suitable starter molecules are, for example, water, ethylene glycol, diethylene glycol, butyl diglycol, glycerol, diethylene glycol, trimethylolpropane, propylene glycol, pentaerythritol, sorbitol, sucrose, ethylenediamine, toluenediamine, triethanolamine, 1,4-butanediol, 1,6-hexanediol, as well as low molecular weight, hydroxyl-group-containing esters of such polyols with dicarboxylic acids or hydroxyl-group-containing oils. The viscosity of the polyols is preferably ≤800 mPas (at 25° C.). The polyols preferably have at least 60% secondary OH groups, more preferably at least 80% secondary OH groups and particularly preferably 90% secondary OH groups. Polyether polyols based on propylene oxide are particularly preferred.

The polyols B) can also comprise fibres, fillers and polymers.

There are particularly suitable as polyepoxides C) low-viscosity aliphatic, cycloaliphatic or aromatic epoxides and mixtures thereof. The polyepoxides can be prepared by reaction of epoxides, for example epichlorohydrin, with alcohols. There can be used as alcohols, for example, bisphenol A, bisphenol F, bisphenol S, cyclohexanedimethanol, phenol-formaldehyde resins, cresol-formaldehyde novolacs, butanediol, hexanediol, trimethylolpropane or polyether polyols. Glycidyl esters, for example of phthalic acid, isophthalic acid or terephthalic acid and mixtures thereof can also be used. Epoxides can also be prepared by epoxidation of organic compounds containing double bonds, for example by epoxidation of fatty oils, such as soybean oil, to give epoxidised soybean oil. The polyepoxides can also comprise monofunctional epoxides as reactive diluents. These can be prepared by reaction of alcohols with epichlorohydrin, for example monoglycidyl ethers of C4-C18 alcohols, cresol, p-tert-butylphenol. Further polyepoxides which can be used are described, for example, in "Handbook of Epoxy resins" by Henry Lee and Kris Neville, McGraw-Hill Book Company, 1967. Preference is given to the use of glycidyl ethers of bisphenol A which have an epoxide equivalent weight in the range from 170 to 250 g/eq, particularly preferably with an epoxide equivalent weight in the range from 176 to 196 g/eq. The epoxide equivalent value can be determined according to ASTM D-1652. Eurepox 710 or Araldite® GY-250, for example, can be used therefor.

Additives D) can optionally be added. These are, for example, catalysts, deaerating agents, antifoams, fillers and reinforcing substances. Further known additives and added ingredients can be used as required. Particular preference is given to latent catalysts which are catalytically active only at from 50 to 100° C.

There can be used as the fibre material sized or unsized fibres, for example glass fibres, carbon fibres, steel or iron fibres, natural fibres, aramid fibres, polyethylene fibres, basalt fibres or carbon nanotubes (CNTs). Glass fibres are particularly preferred. The fibres can be used in the form of chopped fibres with a length of from 0.4 to 50 mm. Preference is given to continuous-fibre-reinforced composite components through the use of continuous fibres. The fibres in the fibre layer can be arranged unidirectionally, randomly distributed or interwoven. In components with a fibre layer comprising a plurality of plies, it is possible to orient the fibres from ply to ply. It is possible to produce unidirectional fibre layers, cross-composite layers or multidirectional fibre layers, unidirectional or interwoven plies being layered one above the other. Particular preference is given to the use of semi-finished fibre products as the fibre material, such as, for example, woven fabrics, non-crimped fabrics, meshes, mats, nonwovens, knitted fabrics or semi-finished 3D fibre products.

The fibre composite components according to the invention can be used in the production of rotor blades for wind turbines, in the production of bodywork components for motor vehicles or in aircraft building, in components for the construction of buildings and roads (e.g. manhole covers) and other structures which are subjected to high stresses.

The invention is to be explained in greater detail by means of the following examples.

EXAMPLES

Fibre-reinforced moulded articles were produced from the polyurethane systems according to the invention comprising polyisocyanates, polyols and polyepoxides and were compared with a polyurethane system comprising polyisocyanate and polyol. For the production of the fibre-reinforced moulded article by vacuum infusion, a Teflon tube having a diameter of 6 mm was filled with glass fibre rovings (Vetrotex® EC2400 P207) so that a glass fibre content of about 65 wt. %, based on the later component, was achieved. One side of the Teflon tube was immersed in the reaction mixture, and vacuum was generated on the other side with an oil pump and the reaction mixture was thereby drawn in. After the tubes were filled, they were tempered overnight at 80° C. The Teflon tube was removed. Mechanical measurements were carried out on the fibre-reinforced test specimens. The glass fibre content was determined by calcination of the test specimens according to DIN EN ISO 1172. The bending strength and bending elongation were determined by means of a 3-point bending test according to ISO 3597-2.

The viscosity was determined immediately after mixing and 60 minutes after mixing of the components using a rotary viscometer at 35° C. with a shear rate of 60 1/s.

The NCO/OH equivalent ratio gives the ratio of the number of NCO groups in the polyisocyanate component A) to the number of OH groups in the polyol component B).

The NCO/EP equivalent ratio gives the ratio of the number of NCO groups in the polyisocyanate component A) to the number of epoxide groups in the polyepoxide component C).

Example 1

48 g of a polyether polyol having an OH number of 380 mg KOH/g and a functionality of 3 (viscosity at 25° C.: 600±50 mPas; trimethylolpropane as starter; propylene oxide-based) were mixed with 12 g of Eurepox® 710 (bisphenol A epichlorohydrin resin having an average molecular weight ≤700 g/mol; epoxide equivalent 183-189 g/eq; viscosity at 25° C.: 10,000-12,000 mPas) and degassed for 60 minutes at a pressure of 1 mbar. 55.76 g of Desmodur® VP.PU 60RE11 (polyisocyanate from Bayer MaterialScience AG; mixture of diphenylmethane diisocyanate and polyphenylenepolymethylene polyisocyanate; NCO content 32.6 wt. %; viscosity at 25° C.: 20 mPas) were then added, and degassing was carried out for 5 minutes at 1 mbar, with stirring. A fibre-reinforced moulded article was then produced by vacuum infusion using the reaction mixture.

Example 2

30 g of a polyether polyol having an OH number of 380 mg KOH/g and a functionality of 3 (viscosity at 25° C.: 600±50 mPas; trimethylolpropane as starter; propylene oxide-based) were mixed with 30 g of Eurepox® 710 (bisphenol A epichlorohydrin resin having an average molecular weight ≤700 g/mol; epoxide equivalent 183-189 g/eq; viscosity at 25° C.: 10,000-12,000 mPas) and degassed for 60 minutes at a pressure of 1 mbar. 53.03 g of Desmodur® VP.PU 60RE11 (polyisocyanate from Bayer MaterialScience AG; mixture of diphenylmethane diisocyanate and polyphenylenepolymethylene polyisocyanate; NCO content 32.6 wt. %; viscosity at 25° C.: 20 mPas) were then added, and degassing was carried out for 5 minutes at 1 mbar, with stirring. A fibre-reinforced moulded article was then produced by vacuum infusion using the reaction mixture.

Comparison Example 3

60.7 g of a polyether polyol having an OH number of 380 mg KOH/g and a functionality of 3 (viscosity at 25° C.: 600±50 mPas; trimethylolpropane as starter; propylene oxide-based) were degassed for 60 minutes at a pressure of 1 mbar. 58.25 g of Desmodur® VP.PU 60RE11 (polyisocyanate from Bayer MaterialScience AG; mixture of diphenylmethane diisocyanate and polyphenylenepolymethylene polyisocyanate; NCO content 32.6 wt. %; viscosity at 25° C.: 20 mPas) were then added, and degassing was carried out for 5 minutes at 1 mbar, with stirring. A fibre-reinforced moulded article was then produced by vacuum infusion using the reaction mixture.

| | Examples | | |
|---|---|---|---|
| | 1 | 2 | 3* |
| NCO/OH equivalent ratio | 1.33 | 2.03 | 1.1 |
| NCO/epoxide equivalent ratio | 3.22 | 1.22 | 0 |
| Viscosity (immediately after mixing) [mPas] | 84 | 95 | 74 |
| Viscosity (60 min after mixing) [mPas] | 4980 | 2070 | 7190 |
| Mixing time at 40° C. [sec.] | 20 | 20 | 45 |
| Glass fibre content [wt. %] | 64.3 | 63.0 | 65.1 |
| Bending strength [MPa] according to ISO 3597-2 | 837.7 | 862.1 | 823.9 |
| Bending elongation [%] according to ISO 3597-2 | 2.80 | 3.04 | 2.69 |
| Interlaminar shear strength (ShortBeam) [MPa] according to ISO 3597-4 | 43.66 | 44.13 | 42.22 |

*comparison

The invention claimed is:

1. A sheet-form fibre composite component prepared by the vacuum-assisted resin transfer moulding process, for use in the production of rotor blades of wind turbines, comprising a fibre layer impregnated with polyurethane, wherein the polyurethane is obtainable from a reaction mixture comprising
    A) one or more polyisocyanates;
    B) one or more polyether polyols comprising an addition product of propylene oxide on a di-functional or poly-functional starter molecule, the polyether polyol(s) comprising at least 80% secondary OH groups;
    C) one or more polyepoxides; and
    D) optionally additives,
    wherein the reaction mixture has a viscosity at 35° C. of from 50 to 250 mPa and a ratio of the number of NCO groups to the number of OH groups of component B) of from 1.3:1 to 10:1 and a ratio of the number of NCO groups to the number of epoxide groups of component C) of from 1.1:1 to 10:1, and
    wherein the one or more polyisocyanates consists of mixtures of diphenylmethane diisocyanate and polyphenylenepolymethylene polyisocyanate with a monomer content of from 70 to 95 wt. % in the polyisocyanate component of A) based on the total weight of the polyisocyanate components.

2. The sheet-form fibre composite component of claim 1, wherein one or more gelcoat layers are present on one side of the polyurethane-containing fibre layer.

3. The sheet-form fibre composite component of claim 2, wherein a spacer layer is present on the side of the polyurethane-containing fibre layer that is remote from the gelcoat layer, which spacer layer is followed by a further polyurethane-containing fibre layer.

4. The sheet-form fibre composite component of claim 1, wherein a spacer layer is present on one side of the polyurethane-containing fibre layer, which spacer layer is followed by a further polyurethane-containing fibre layer.

5. A process for producing the sheet-form fibre composite component of claim 1 by the vacuum-assisted resin transfer moulding process, comprising
    a) preparing a mixture of
        A) one or more polyisocyanate;
        B) one or more polyether polyols comprising an addition product of propylene oxide on a di-functional or poly-functional starter molecule, the polyether polyol(s) comprising at least 80% secondary OH groups;

C) one or more polyepoxides; and
D) optionally additives,
wherein the mixture has a viscosity at 35° C. of from 50 to 250 mPa and a ratio of the number of NCO groups to the number of OH groups of component B) of from 1.3:1 to 10:1 and a ratio of the number of NCO groups to the number of epoxide groups of component C) of from 1.1:1 to 10:1, and wherein the one or more polyisocyanates consists of mixtures of diphenylmethane diisocyanate and polyphenylenepolymethylene polyisocyanate with a monomer content of from 70 to 95 wt. % in the polyisocyanate component of A) based on the total weight of the polyisocyanate components;

b) laying a fibre material in a mould half;

c) introducing the mixture prepared in step a) into the fibre material of step b) to produce an impregnated fibre material; and d) curing the impregnated fibre material at a temperature of from 20 to 120° C.

6. The process of claim 5, wherein step d) is performed at a temperature of from 70 to 90° C.

7. The process of claim 5, wherein before step b), b') one or more gelcoat layers are introduced into the mould half.

8. The process of claim 5, wherein after step b) and before step c) a spacer material layer and then a fibre material layer are introduced into the mould half.

9. A rotor blade for wind turbines, a bodywork component for motor vehicles, an aircraft, a building, a road, or a structure which is subjected to high stress comprising the sheet-form fibre composite component of claim 1.

* * * * *